Aug. 23, 1938.   E. B. NOWOSIELSKI   2,127,983
COMBUSTION CONTROL FOR INTERNAL COMBUSTION ENGINES
Filed Oct. 1, 1936

INVENTOR.
Edward B. Nowosielski
BY
Martin J. Finnegan
ATTORNEY.

Patented Aug. 23, 1938

2,127,983

UNITED STATES PATENT OFFICE 2,127,983

COMBUSTION CONTROL FOR INTERNAL COMBUSTION ENGINES

Edward B. Nowosielski, Bloomfield, N. J., assignor to Eclipse Aviation Corporation, East Orange, N. J., a corporation of New Jersey Application October 1, 1936, Serial No. 103,594

3 Claims. (Cl. 123—169)

This invention relates to ignition devices for internal combustion engines, and particularly, though not exclusively to ignition devices wherein a heating coil is included for first heating the combustion chamber of an engine to expedite the attainment of ignition temperature, whereupon ignition is produced by means of a jump spark.

An object of the invention is to provide novel means for energizing and insulating a heating coil of the exposed type—that is, one which is adapted to transfer heat to the combustion chamber by direct radiation.

In one embodiment (illustrated in Figs. 1 and 2 of the accompanying drawing) the heating coil is combined with a spark plug in such manner that the current passing through the heating coil also flows through the ground electrode of the spark plug, thereby raising the temperature of the spark plug electrodes to an extent which insures that any liquid fuel sprayed thereagainst will be instantly vaporized—an action very desirable as an aid in prompt starting of the engine.

In a second embodiment, shown in Figs. 3 and 4, the heating coil is separate from any spark producing elements and is of correspondingly simpler construction, rendering it preferable for use in Diesel or other engines which do not require a high tension spark for fuel ignition. In both embodiments, however, there is a disclosure of means for attaining a large area of current conducting, heat radiating surface directly exposed in the combustion chamber, and this feature constitutes one of the important phases of this invention.

Other objects and characteristics of the invention will be more apparent from the following detailed description, taken in connection with the accompanying drawing wherein two embodiments of the invention are shown. It is to be expressly understood, however, that the drawing is for the purpose of illustration only, and is not designed as a definition of the limits of the invention, reference being had for this purpose to the appended claims.

In the drawing:—

Figure 2:
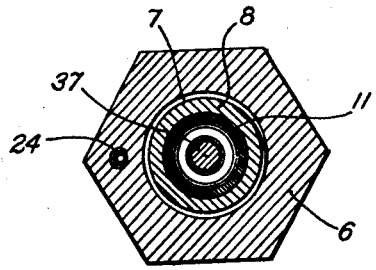
Fig. 2 is a transverse sectional view along the line 2—2 of Fig. 1.
Figure 1:
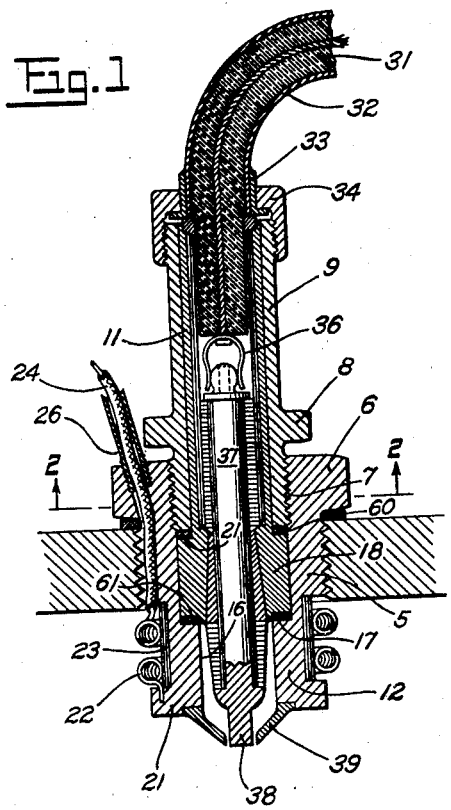
Fig. 1 is a longitudinal section through a device embodying the invention.

Referring first to the embodiment shown in Figs. 1 and 2, the invention is therein shown as incorporated in a compact, symmetrical unit having a shell portion 5 of current conducting material adapted to serve as the ground connection for the negative electrode of the plug. As shown, the shell 5 includes an upper polygonal portion 6 adapted for engagement by the usual socket type of wrench for attachment of the unit, and a central internally threaded portion 7 adapted to engage corresponding threads cut in a member 8 which, as shown, has an integral extension 9 of sufficient length to receive and enclose substantially the entire length of the unthreaded and thinner wall section 11 of the inner shell.

At its lower end shell portion 5 has an integral extension 12 shown as provided with an inwardly extending portion 16 providing an annular ledge 17 to receive the lower section 18 of the inner shell 11, while a second annular ledge 21 at the base of extension 12 constitutes a seat and anchoring means for the lower section of the current conducting wire 22 which is wound about the extension 12, but separated from the cylindrical surface thereof by the interposition of a dielectric element shown as taking the form of a flexible material of high dielectric strength, such as a sheet 23 of mica which may be wrapped about the extension 12 to a depth of any desired number of layers, prior to winding the wire 22 thereon to form the heating coil. At its upper section wire 22 is insulated from the metal base 5 by application of a covering 24 of rubber or other materials suitable for the purpose of insuring against a short-circuiting of the coil 22 at this upper section thereof—the intended path for the heating current being down through all turns of the coil 22, then to ledge 21 and up again by way of extension 12 of the grounded base 5.

The high tension current carrying cable 31 is shown as encased in a metallic braid 32 electrically bonded to the shell 9 through coupling elements 33 and 34, and held securely within the socketed part of the mica lined inner shell 11, so as to maintain electrical connection between the cable terminal 36 and the spindle 37 whose lower end 38 constitutes the center, or positive, electrode of the plug, the negative electrode 39 being integrated with the grounded extension 12 of base 5.

Figure 3:
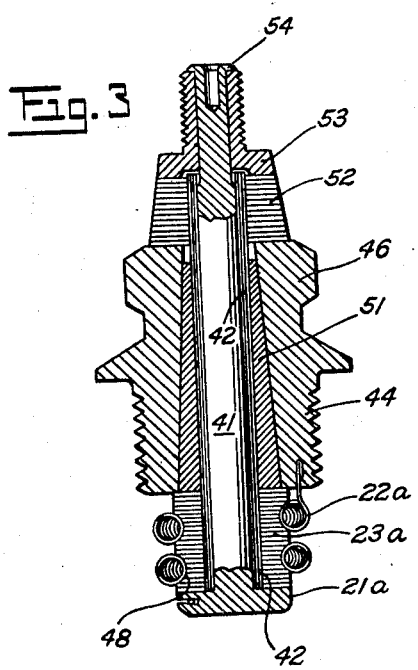
Fig. 3 is a longitudinal section of a second embodiment of the invention.
Figure 4:
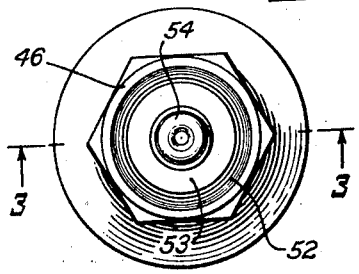
Fig. 4 is a plan view of the device of Fig. 3.

In Fig. 3 the heating coil 22a, like the coil 22 of Fig. 1, is anchored at its lower end to the base 21a of a central current conducting spindle 41, and is otherwise insulated from the spindle (to prevent short-circuiting of any section of the coil 22a) by the interposition of a sheet mica wrapper 42 and a stack 23a of mica washers, the upper end of the coiled wire being grounded by fastening it to the threaded outer shell 44 which attaches to the cylinder wall, there being a polygonal wrench receiving formation 46 for this purpose.

It will be observed that in both embodiments the wire forming the heating unit is of relatively small diameter and is therefore suited for carrying current of relatively high voltage. While I have increased the radiating surface by forming the wire into a toroidal shape this in turn creates a problem of suitably supporting and retaining this additional length of wire on the plug body. My solution is to provide a helical groove or thread 48 about the mica stack 23a, to receive the coil and thus hold it securely against the tendency to sag or otherwise shift its position.

As a means of making the plug of Fig. 3 gastight, I provide a tapered bore in the shell 44, place a correspondingly tapered sleeve 51 on the insulated spindle 41, slide the assembly of parts 41, 42, 23a and 51 into the tapered bore of the shell, add the upper stack 52 of mica washers and the cap 53, and then apply pressure longitudinally to upset the end 54 of the spindle against the cap 53, thus forcing the soft sleeve 51 to become permanently distorted into a gas-tight grip against both the shell and the insulated spindle. A correspondingly tight seal is possible in Figure 1, due to the provision of gaskets 60 and 61 of soft metal, adapted to be pressed against the surface of the shell 5 to bar leakage along said surface.

It will be noted that both the high and low tension circuits of Figure 1 are completely shielded against emanation of electromagnetic energy likely to interfere with adjacent radio frequency circuits, each of the cables 24 and 31 being encased in grounded metallic conduits, as shown at 26 and 32, respectively.

What is claimed is:—

1. An ignition accessory for internal combustion engines comprising, a current conducting body, a heating unit coiled about the body above its base and exposed within the combustion chamber of the engine, and insulating means interposed between the body and the heating unit, said means comprising a sheet of dielectric material wrapped about said body and held in position thereon within the superimposed turns of wire constituting said heating unit.

2. An ignition accessory comprising, a current conducting grounded cylinder with an electrode carried adjacent its base, a second electrode within said cylinder to transfer high tension current to said first-named electrode, by way of the intervening spark gap, a heating unit to receive low tension current and transfer it to ground by way of said cylinder, and dielectric material located on both sides of said grounded cylinder, to control the path of current flow of both the high and low tension currents.

3. An ignition accessory comprising, a current conducting grounded cylinder with an insulated outer surface and an electrode carried adjacent its base, a second electrode within said cylinder to transfer high tension current to said first-named electrode, by way of the intervening spark gap, and a heating unit to receive low tension current and transfer it to ground by way of said cylinder, said heating unit being coiled about the insulated outer surface of said cylinder.

EDWARD B. NOWOSIELSKI.